UNITED STATES PATENT OFFICE.

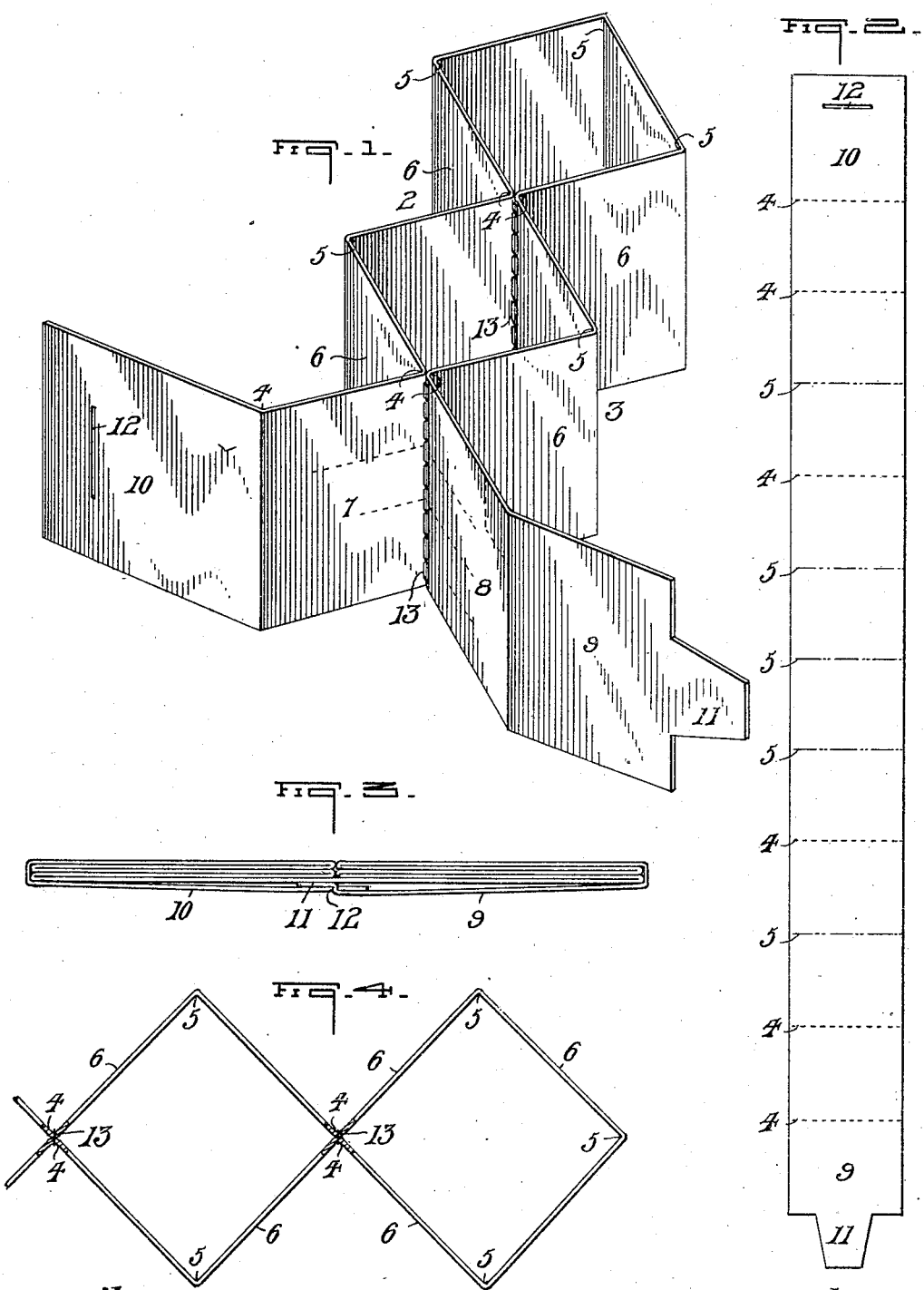

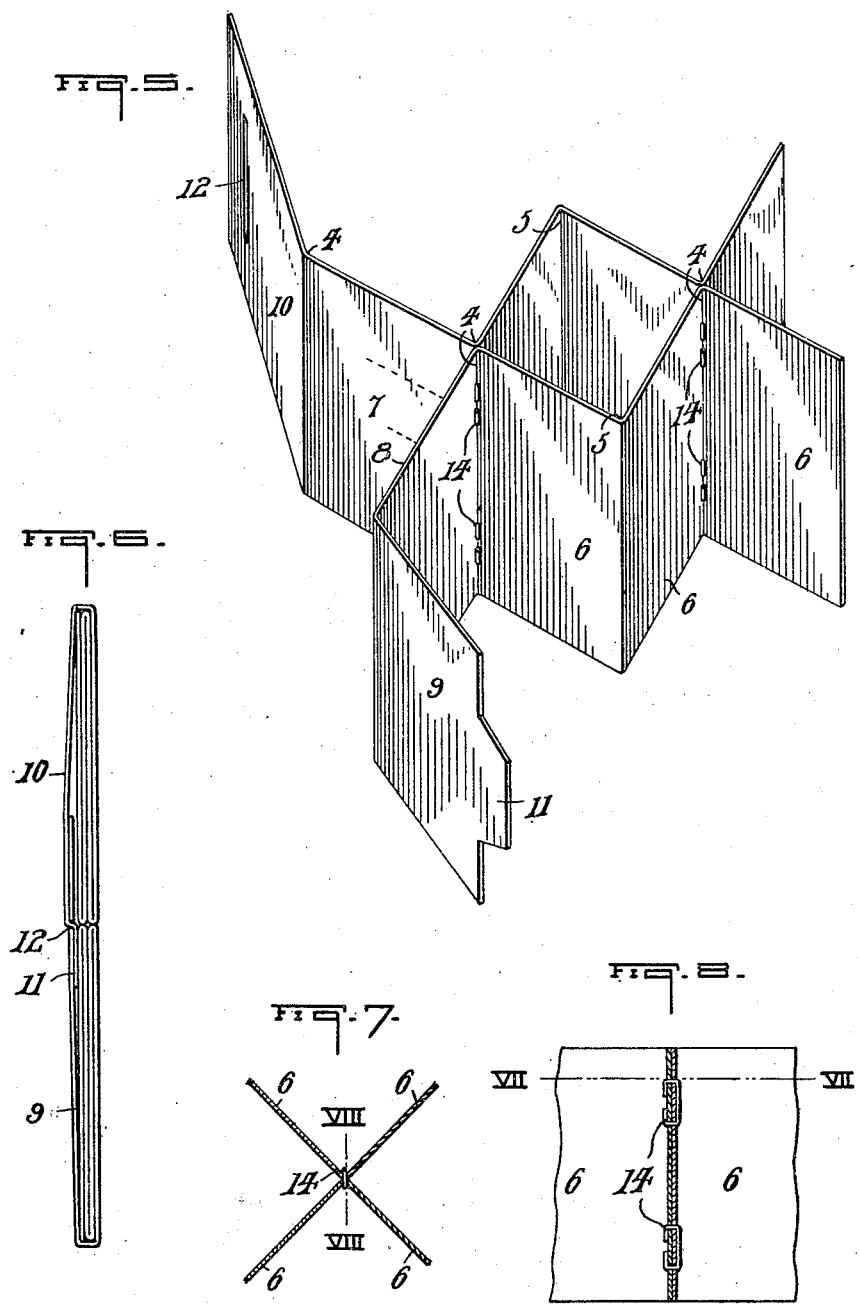

MICHAEL H. WILSON, OF PITTSBURG, PENNSYLVANIA, ASSIGNOR TO PATENTED SPECIALTIES COMPANY, OF PITTSBURG, PENNSYLVANIA, A CORPORATION OF DELAWARE.

DISPLAY-FOLDER.

956,252.      Specification of Letters Patent.      Patented Apr. 26, 1910.

Application filed September 9, 1909. Serial No. 516,977.

*To all whom it may concern:*

Be it known that I, MICHAEL H. WILSON, of Pittsburg, in the county of Allegheny and State of Pennsylvania, have invented certain new and useful Improvements in Display-Folders, of which the following is a specification.

An object of my invention is to provide a new and improved display folder or device particularly adapted for use as a mailing-folder; comprising a plurality of display sections that may be extended to display a series of pictures, cuts, samples, or other objects and which may be collapsed or folded into a cover convenient for mailing.

In the accompanying drawings which illustrate applications of my invention, Figure 1, is a perspective view of a folder embodying my invention, made from a single piece of some suitable material, as card-board; Fig. 2, a plan of the blank from which the folder is made particularly showing the creases or score lines; Fig. 3, a plan showing the foldable members collapsed and contained within a cover; Fig. 4, a detail view of foldable members extended; Fig. 5, a perspective view of a modified form of folder; Fig. 6 a top plan showing the foldable members inclosed within a cover; Fig. 7, a detail plan taken on line 7—7 of Fig. 8; and Fig. 8 a detail view particularly showing the manner of joining the foldable members of the form of Fig. 5.

The folder as illustrated in the form of Fig. 1, is made of a single strip of some suitable material, as card-board, and comprises two foldable members 2 and 3 divided by creases 4 and 5 into a plurality of display sections or panels 6. Creases 4 and 5 are formed on opposite faces of the blank as clearly indicated by Fig. 2, and are formed by folding the blank in opposite directions or by a right fold and a left fold.

The cover, which is designed to contain the foldable members 2 and 3 when the latter are collapsed is also, in the form of Fig. 1, made from the same blank or piece as members 2 and 3 and as illustrated comprises members 7 and 8 and flap portions 9 and 10. Flap portion 9 is formed with a tongue 11 adapted to enter a slit 12 formed in member 10.

The members 2 and 3 are secured together at their alternate and corresponding creases by some convenient and suitable means; as illustrated in the form of Fig. 1, said members are stitched or sewed as indicated by 13.

The display sections or panels 6 are designed to receive pictures, cuts, samples, etc.

In the form of my invention as illustrated by Fig. 5, the folder is made from two blanks or pieces instead of from a single piece as in the form of Fig. 1, and instead of joining the foldable members 2 and 3 at their alternate and corresponding creases by stitching or sewing I employ staples 14.

What I claim is:

A display folder comprising two foldable members each correspondingly creased on opposite faces to produce right and left folds and to form display sections, means for securing the members together at their alternate and corresponding creases, and a cover for inclosing the members.

In testimony whereof I affix my signature in presence of two witnesses.

MICHAEL H. WILSON.

Witnesses:
  A. C. WAY,
  W. G. DOOLITTLE.